United States Patent
Balasubramanian et al.

(10) Patent No.: US 12,236,939 B2
(45) Date of Patent: Feb. 25, 2025

(54) METHOD OF GENERATING A TRIGGER WORD DETECTION MODEL, AND AN APPARATUS FOR THE SAME

(71) Applicant: SAMSUNG ELECTRONICS CO., LTD., Suwon-si (KR)

(72) Inventors: Sivakumar Balasubramanian, Mountain View, CA (US); Gowtham Srinivasan, San Jose, CA (US); Srinivasa Rao Ponakala, Sunnyvale, CA (US); Anil Sunder Yadav, San Jose, CA (US); Aditya Jajodia, Edison, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 369 days.

(21) Appl. No.: 17/499,072

(22) Filed: Oct. 12, 2021

(65) Prior Publication Data
US 2022/0293088 A1 Sep. 15, 2022

Related U.S. Application Data

(60) Provisional application No. 63/160,697, filed on Mar. 12, 2021.

(51) Int. Cl.
*G10L 15/05* (2013.01)
*G06N 3/096* (2023.01)
(Continued)

(52) U.S. Cl.
CPC .............. *G10L 15/05* (2013.01); *G06N 3/096* (2023.01); *G10L 15/063* (2013.01); *G10L 15/16* (2013.01); *G10L 15/20* (2013.01); *G10L 15/22* (2013.01); *G10L 15/30* (2013.01); *G10L 2015/088* (2013.01)

(58) Field of Classification Search
CPC ......... G06N 3/096; G10L 15/22; G10L 15/16; G10L 15/20; G10L 15/063; G10L 15/05; G10L 2015/088
See application file for complete search history.

(56) References Cited

U.S. PATENT DOCUMENTS

| 7,107,214 B2 | 9/2006 | Nakatsuka |
| 9,495,955 B1 | 11/2016 | Weber et al. |

(Continued)

FOREIGN PATENT DOCUMENTS

CN 109637526 A 4/2019

OTHER PUBLICATIONS

Myer et al., "Efficient keyword spotting using time delay neural networks." arXiv preprint arXiv:1807.04353 (Year: 2018).*

*Primary Examiner* — Samuel G Neway
(74) *Attorney, Agent, or Firm* — Sughrue Mion, PLLC (57) ABSTRACT

A method of generating a trained trigger word detection model includes training an auxiliary model, based on an auxiliary task, to concentrate on one or more utterances and/or learn context of the one or more utterances using generic single word and/or phrase training data; and obtaining a trigger word detection model by retraining one or more final layers of the auxiliary model, which is weighted based on the auxiliary task, based on a trigger word detection task that detects one or more trigger words. The retraining uses training data specific to the one or more trigger words.

20 Claims, 6 Drawing Sheets

(51) Int. Cl.
  *G10L 15/06* (2013.01)
  *G10L 15/08* (2006.01)
  *G10L 15/16* (2006.01)
  *G10L 15/20* (2006.01)
  *G10L 15/22* (2006.01)
  *G10L 15/30* (2013.01)

(56) References Cited

U.S. PATENT DOCUMENTS

| | | |
|---|---|---|
| 10,713,593 B2 | 7/2020 | Chen et al. |
| 2015/0127594 A1* | 5/2015 | Parada San Martin ............... G10L 15/16 706/16 |
| 2017/0092265 A1* | 3/2017 | Sainath ............... G10L 15/16 |
| 2017/0337464 A1* | 11/2017 | Rabinowitz ............ G06F 17/16 |
| 2019/0347806 A1* | 11/2019 | Vajapey ................ G06T 7/20 |
| 2020/0013390 A1* | 1/2020 | Wang ................. G06N 3/04 |
| 2020/0327881 A1 | 10/2020 | Kurata |
| 2021/0043190 A1* | 2/2021 | Wang ................ G10L 21/0272 |
| 2021/0055778 A1* | 2/2021 | Myer ................. G06N 3/045 |
| 2021/0105565 A1* | 4/2021 | Pedersen ................ G06N 3/08 |
| 2021/0133602 A1* | 5/2021 | Amrani ................ G06N 5/04 |
| 2021/0183367 A1* | 6/2021 | Sharifi ................ G06N 3/045 |
| 2022/0293088 A1* | 9/2022 | Balasubramanian ............... G06N 3/0895 |
| 2022/0343895 A1* | 10/2022 | Tomar ................ G10L 15/16 |

* cited by examiner

METHOD OF GENERATING A TRIGGER WORD DETECTION MODEL, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/160,697 filed on Mar. 12, 2021, in the U S. Patent & Trademark Office, the disclosure of which is incorporated by reference herein in its entirety.

BACKGROUND

1. Field

The disclosure relates to detecting words in audio files, and more particularly to a method of generating a trigger word detection model using transfer learning, and an apparatus for the same.

2. Description of Related Art

Voice commands are a common feature on many electronic devices having microphones. Many voice command processes use wakeup words to ensure only words intended to be detected by the user are processed. However, due to additional background noises detected by the microphones and differences in peoples voices and accents, it is difficult to train a model to accurately detect trigger words.

In many cases, a resource intensive and cumbersome training process using user specific data is needed to generate an effective model. Further, many training processes also require human input for labeling the training data. Additionally, using conventional raining techniques, models overfit to certain voice textures, accents, and noises, and therefore perform poorly in other categories.

SUMMARY

According to an aspect of the disclosure, a method of generating a trained trigger word detection model may include training an auxiliary model, based on an auxiliary task, to concentrate on one or more utterances and/or learn context of the one or more utterances using generic single word and/or phrase training data; and obtaining a trigger word detection model by retraining one or more final layers of the auxiliary model, which is weighted based on the auxiliary task, based on a trigger word detection task that detects one or more trigger words. The retraining may use training data specific to the one or more trigger words.

According to another aspect of the disclosure, an apparatus for generating a trained trigger word detection model may include at least one memory storing instructions; and at least one processor configured to execute the instructions to: train an artificial intelligence model, based on an auxiliary task, to concentrate on one or more utterances and/or learn context of the one or more utterances using generic single word and/or phrase training data and obtain a trigger word detection model by retraining one or more final layers of the artificial intelligence model, which is weighted based on the auxiliary task, based on a trigger word detection task that detects one or more trigger words. The retraining may use training data specific to the one or more trigger words.

According to yet another aspect of the disclosure, a non-transitory computer-readable medium may store instructions including one or more instructions that, when executed by one or more processors cause the one or more processors to: train an artificial intelligence model, based on an auxiliary task, to concentrate on one or more utterances and/or learn context of the one or more utterances using generic single word and/or phrase training data; and obtain a trigger word detection model by retraining one or more final layers of the artificial intelligence model, which is weighted based on the auxiliary task, based on a trigger word detection task that detects one or more trigger words. The retraining may use training data specific to the one or more trigger words Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 1A:
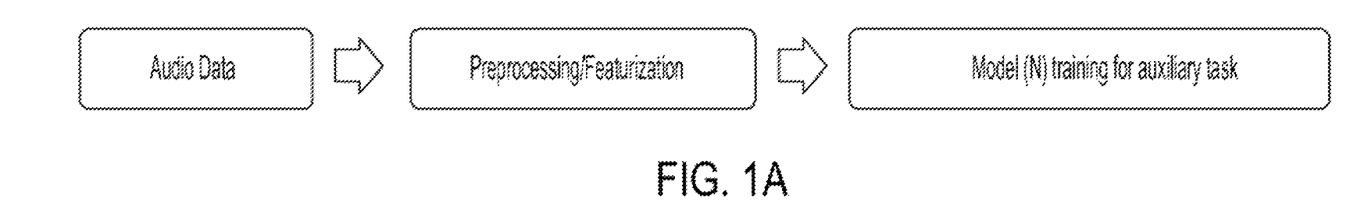
FIGS. 1A and 1B are diagrams showing a general overview of a method of generating a trained trigger word detection model according to an embodiment.
Figure 1B:
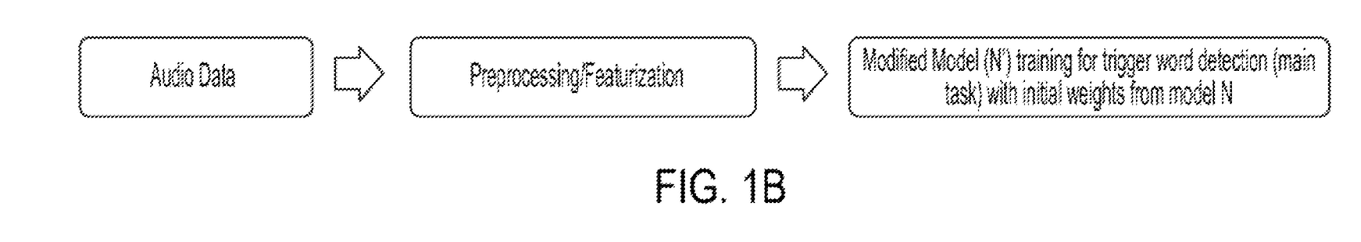

FIGS. 1A and 1B are diagrams showing a general overview of a method for generating a trained trigger word detection model according to an embodiment.

FIG. 1A shows a first step 100a of the training method which includes training an auxiliary model based on an auxiliary task according to an embodiment. As shown in FIG. 1A, the training method 100 may obtain a feature vector by preprocessing and featurizing audio data. The auxiliary model may then be trained based on an auxiliary task using the feature vector.

The auxiliary task may be selected to train the model to learn context from an audio recording and/or concentrate on utterances in an audio recording. For example, as discussed below with regard to the non-limiting embodiment of FIG. 3, the auxiliary task may be predicting a distance between two utterances utilizing contrastive loss. According to another embodiment, as discussed below with regard to the non-limiting embodiment of FIG. 4, the auxiliary task may predict whether three audio segments are in sequence or are jumbled. Accordingly, by training the auxiliary model based on these auxiliary tasks which are concerned with the utterances and context, the auxiliary model will be trained to learn context from an audio file and concentrate on utterances in an audio file.

FIG. 1B shows a second step of the training method 100b which includes retraining one or more of the final layers (such as the final dense layers) of the auxiliary model to obtain a trigger word detection model according to an embodiment. As shown in FIG. 1B, a feature vector may be obtained by preprocessing and featurizing audio data. The one or more final layers of the auxiliary model, which have initial weights based on the auxiliary task training, may then be retrained based on a main task (trigger word detection) using the feature vector. Accordingly, the one or more final layers of the trigger word detection model may be weighted based on the trigger word detection task while the initial layers may be weighted based on the auxiliary task. According to another embodiment, all the model layers of the auxiliary model may be retrained based on the main task with a reduced learning rate.

By pretraining the trigger word detection model to learn context from an audio recording and/or concentrate on utterances in an audio recording based on the auxiliary task, the trigger word detection model may provide more robust trigger word detection.

Further, the trigger word detection model can be more efficiently trained to detect a specific trigger word utterance of a speaker (i.e., the trigger word spoken in the user's accent). That is, retraining the one or more final layers of the pretrained auxiliary model based on the specific trigger word utterance of the speaker can be accomplished with less training than training a full, untrained model based on the specific trigger word utterance of the speaker.

Additionally, by pretraining the trigger word detection model based on the auxiliary task, the trigger word detection model is less likely to overfit to certain voice textures, accents, and noises.

Figure 2:
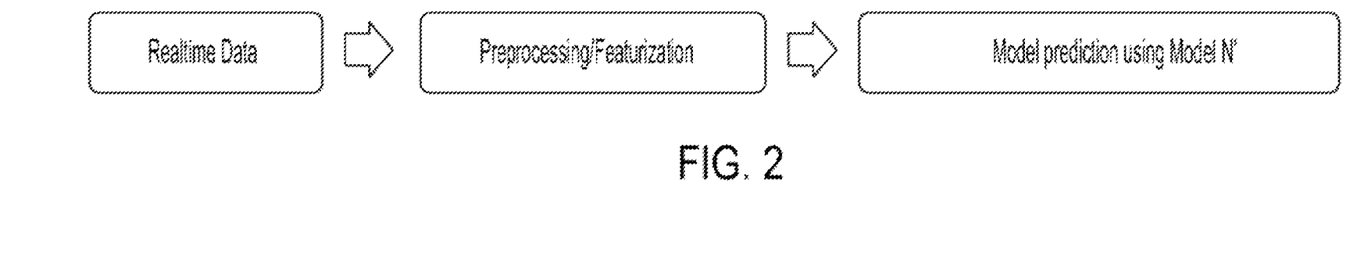
FIG. 2 is a diagram of a method of operating the trained trigger word detection model according to an embodiment.

FIG. 2 is a diagram of a method 200 of operating the trained trigger word detection model according to an embodiment. As shown in FIG. 2, a feature vector may be obtained by preprocessing and featurizing audio data, such as real time audio data obtained from a microphone of an electronic device. The feature vector may then be input into the trained trigger word detection model which detects whether the audio data includes the trigger word by analyzing the feature vector.

Figure 3:
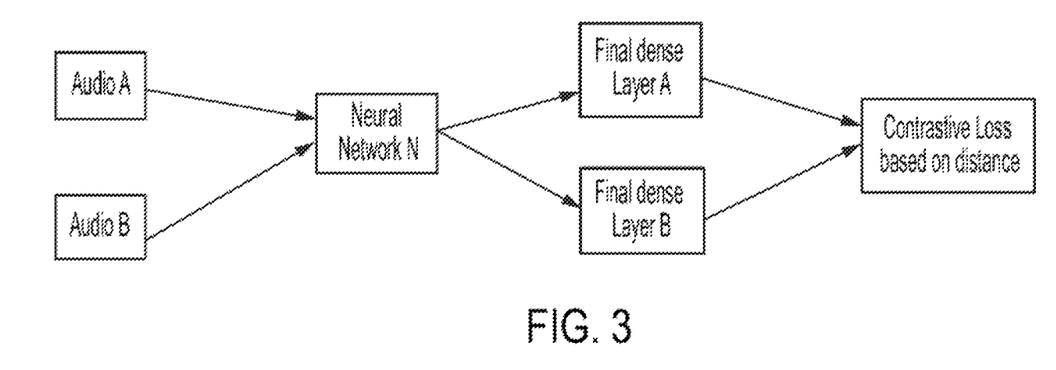
FIG. 3 is a diagram of a process for training an auxiliary model using self-supervised contrastive learning according to an embodiment.

FIG. 3 is a diagram of a process 300 for training an auxiliary model using self-supervised contrastive learning according to an embodiment.

As shown in FIG. 3, two vectors corresponding to respective audio files (Audio A and Audio B) are input into an auxiliary model (Neural Network N) which obtains two respective representations of Audio A and Audio B (Final Dense Layer A) and (Final Dense Layer B). A contrastive loss based on distance is then determined between the two respective representations of Audio A and Audio B. Using process 300, the auxiliary model is trained to move audio files having the same utterance closer together and audio files with difference utterances further away in a virtual space. According to an embodiment, the Neural Network N may be a Siamese network, but the disclosure is not limited thereto.

According to an embodiment, Audio A may correspond to clean audio of a trigger word such as "hi Bixby." Audio B may correspond to a positive or a negative audio. The positive audio may include the trigger word augmented with noise, the trigger word augmented with noise and reverberations, or the trigger word in a different accent. According to an embodiment, the positive audio may include an augmented version of the clean audio. The negative audio may be only the noise used for augmentation, only noise and reverberations used for augmentation, or a different word other than the trigger word which may or may not be augmented with noise and/or reverberations. The following Table 1 is an example of a non-limiting batch of Audio A and Audio B that may be used to train an auxiliary model.

TABLE 1

| | Audio A | Audio B |
|---|---|---|
| Positive | "Hi Bixby" clean from speaker 1 | "Hi Bixby" clean audio from speaker 1 + noise 1 Hi Bixby" clean audio from speaker 1 + |

TABLE 1-continued

| | Audio A | Audio B |
|---|---|---|
| | | noise 1 + reverberation 1 |
| | | "Hi Bixby" clean audio from speaker 2 + noise 1 |
| | | "Hi Bixby" clean audio from speaker 2 + noise 1 + reverberation 1 |
| | | "Hi Bixby" in a different accent from the clean audio |
| Negative | "Hi Bixby" clean from speaker 1 | Noise 1 |
| | | Noise 1 + Reverberation 1 |
| | | Different word clean audio from speaker 1 or 2 |
| | | Different word clean audio from speaker 1 or 2 + noise 1 + reverberation 1 |

Other training batches may include pairings of trigger words from other speakers and other noise/reverberation types. According to an embodiment, the auxiliary tasks can be generic (not include the trigger word). According to an embodiment, the training batches may include multiple trigger words and/or trigger phrases (e.g. "hi bixby").

Using process 300, the auxiliary model may learn useful representations of the trigger word irrespective of the accent/speaker and noise environment.

Figure 4:
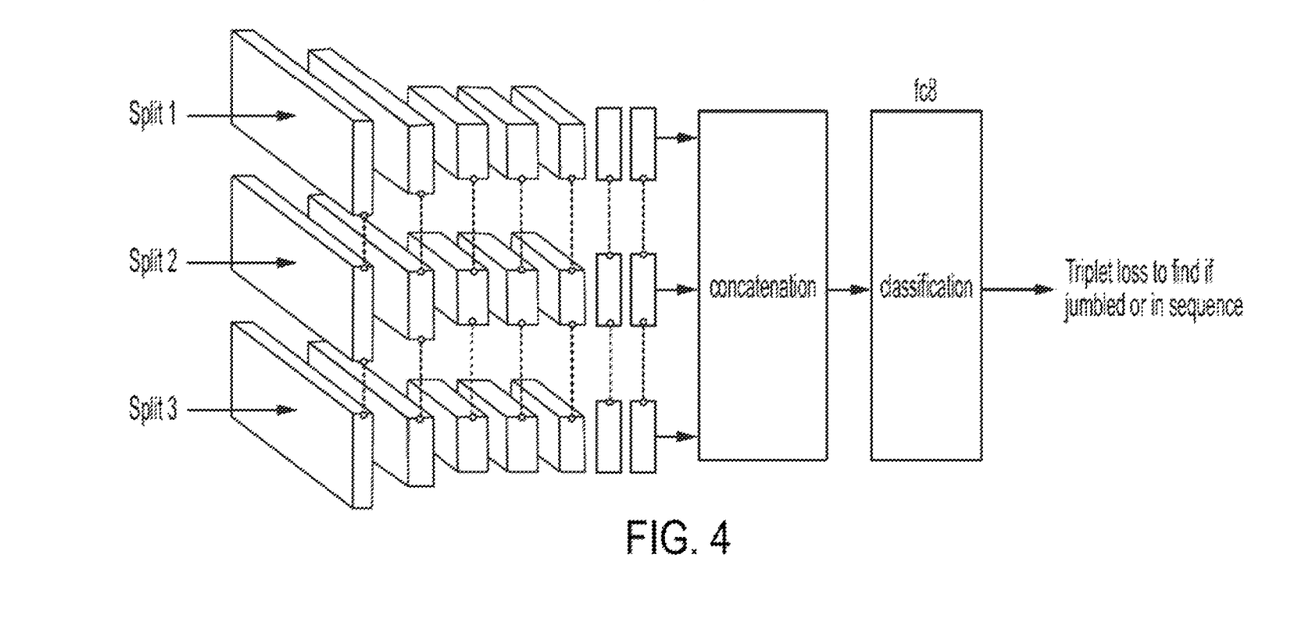
FIG. 4 is a diagram of a process for training an auxiliary model using jumbled utterance detection according to an embodiment.

FIG. 4 is a diagram of a process 400 for training an auxiliary model using jumbled utterance detection according to an embodiment. According to an embodiment, the neural network being trained by process 400 may be a triplet Siamese network, but the disclosure is not limited thereto.

As shown in FIG. 4, audio of a trigger word may be split into multiple segments. In the non-limiting embodiment shown in FIG. 4, the trigger word is split into three segments (Split 1, Split 2, Split 3), however, in other embodiment the trigger word may be split into more or less than 3 segments. The split audio may be augmented with noise or reverberations. Augmentation may be done either after splitting or before splitting depending on model performance.

A portion of the segments are then jumbled before being input into an auxiliary model (i.e. triplet Siamese network) so the model receives a mix of jumbled and in sequence audios. The auxiliary model may determine if the segments are in sequence or are jumbled using a triplet loss function. According to an embodiment, the auxiliary model may also or alternatively be trained with audio of utterance other than the trigger word based on the same conditions.

Training process 400 may teach the auxiliary model to understand the arrangement of phonemes in words irrespective of noise conditions. By making the auxiliary model predict jumbled sequences, the model learns to concentrate more on features of the trigger words. Once the auxiliary model is trained on this auxiliary task, the feature layers of the model may be able to model part of the audio that has the trigger word. By using the weights based on this auxiliary task to initialize the trigger word detection model, the trigger model may be more robust to noise and other perturbations.

Figure 5:
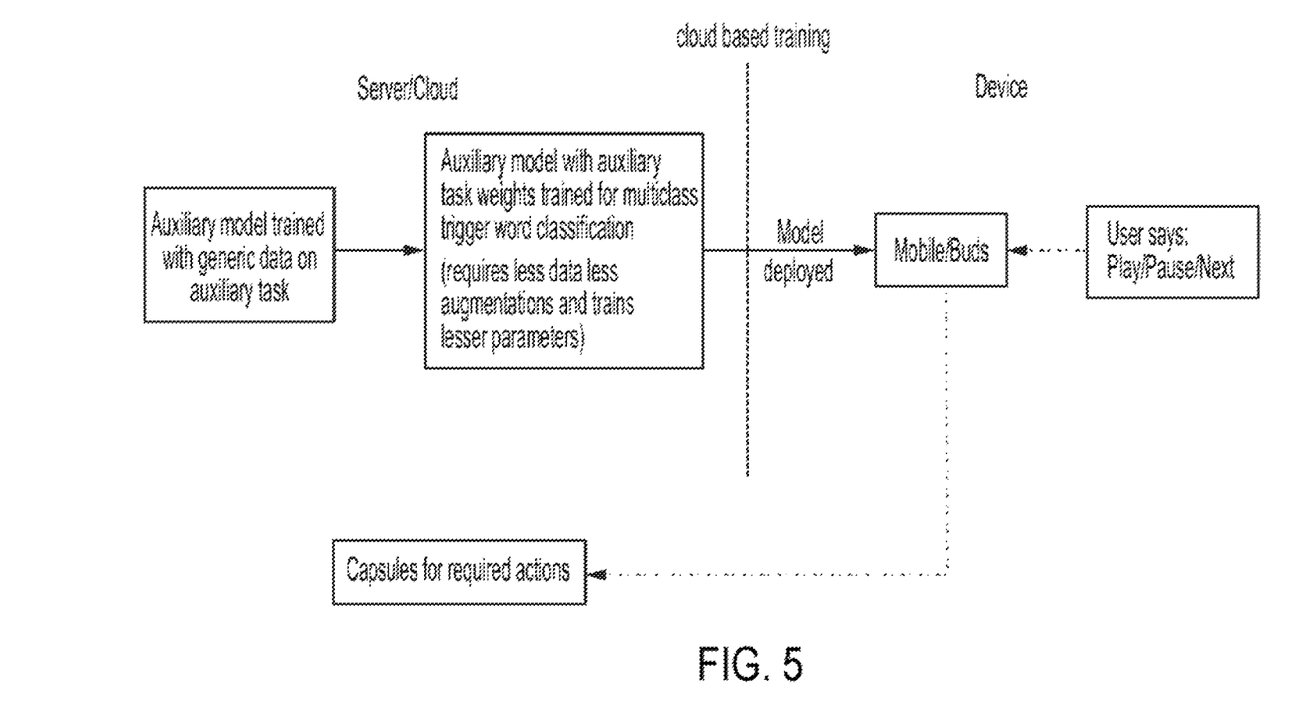
FIG. 5 is a diagram of a cloud-based process for raining the trigger word detection model, according to an embodiment.

FIG. 5 is a diagram of a cloud based process 500 for training the trigger word detection model, according to an embodiment.

As shown in FIG. 5, the auxiliary model may be trained on a server or in the cloud with generic data based on the auxiliary task. The generic data may be data from a generic, open-source data set that includes utterances other than the trigger word. One or more of the final layers or all of the model layers of the auxiliary model, that is weighted based on the auxiliary task, may then be retrained for trigger word classification and/or detection on the server or in the cloud. In this embodiment, the fully trained trigger word detection model may be sent to an edge device such as a smartphone or smart earbuds that may use the model.

For example, as shown in FIG. 5, a user may say play, pause, or next when listening to music playlist. The trigger word detection model may detect that the trigger word was uttered by the user and classify the trigger word to generate a capsule for an action associated with the detected trigger word (i.e. the capsule may direct the edge device to pause music when the trigger word "pause" is detected).

Figure 6:
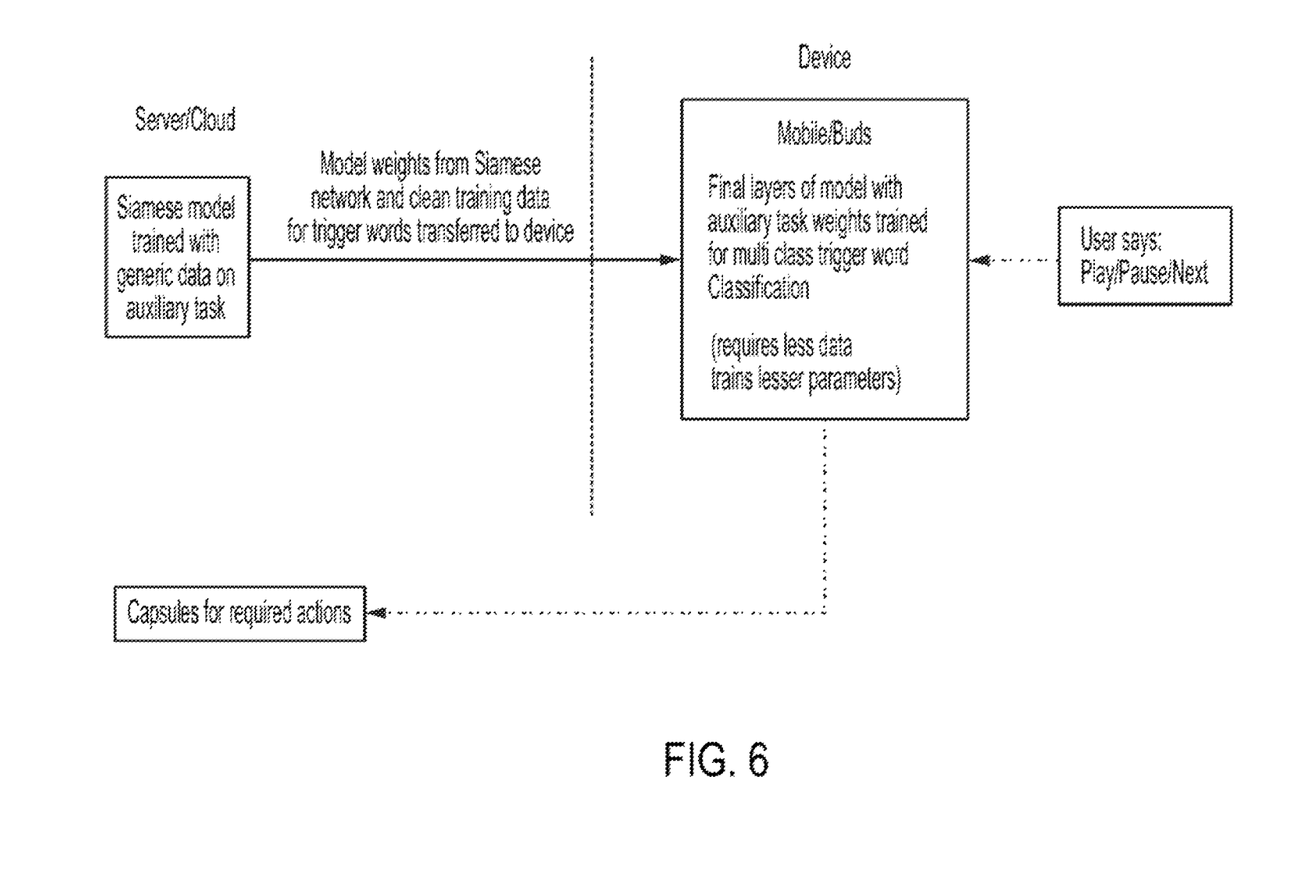
FIG. 6 is a diagram of a hybrid cloud and an on device-based process for training the trigger word detection model, according to an embodiment.

FIG. 6 is a diagram of a hybrid cloud and an on device-based process 600 for training the trigger word detection model, according to an embodiment.

As shown in FIG. 6, the auxiliary model may be trained on a server or in the cloud with generic data based on the auxiliary task. One or more of the final layers or, all of the model layers of the auxiliary model that is weighted based on the auxiliary task may then be retrained for trigger word classification and/or detection on an edge device such as a smartphone or earbuds. In this embodiment, the more resource intensive training is performed on the server which is has greater resources than an edge device. Then, the less resource intensive retraining of the one or more final layers may be performed on the resource restricted device. This embodiment may also allow a user to perform the final training based on their own voice without having to upload private data to a server.

Figure 7:
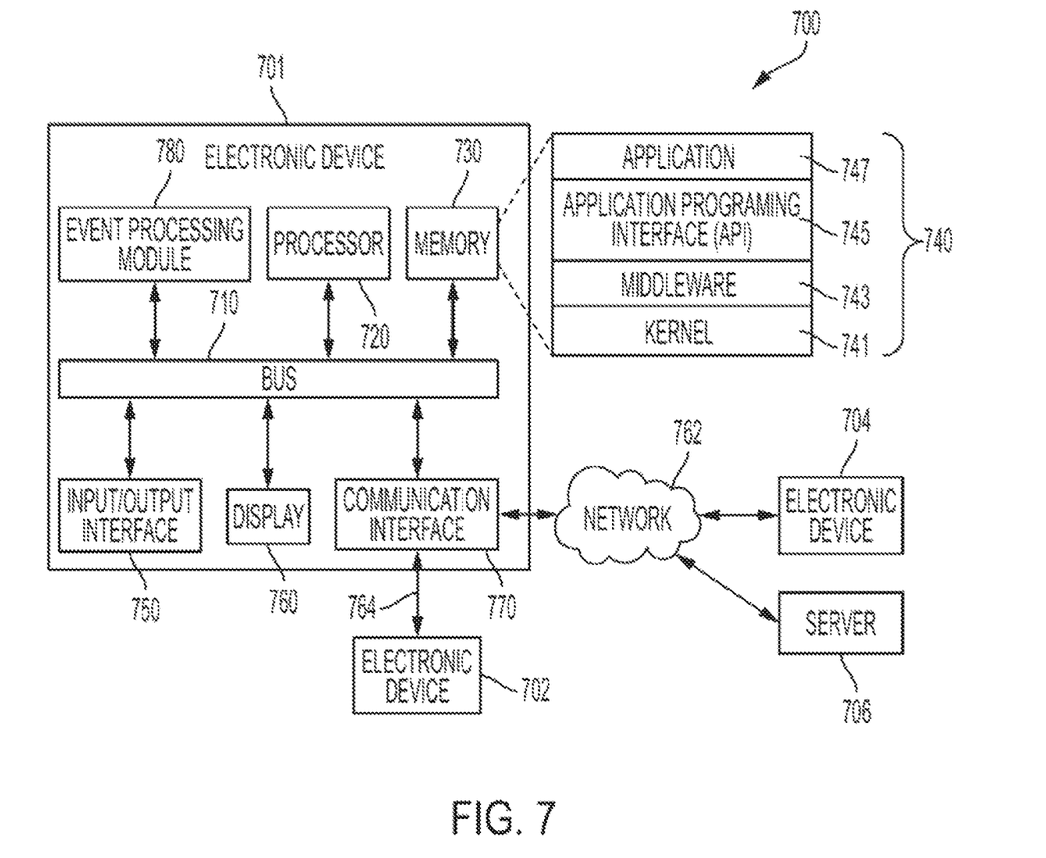
FIG. 7 is a diagram of a network environment for generating a trained trigger word detection model according to an embodiment.

The method of generating a trained trigger word detection model or the method of detecting a trigger word may be performed by electronic device 701 in a network environment 700 as shown in FIG. 7, according to an embodiment. FIG. 7 is for illustration only, and other embodiments of the electronic device and network could be used without departing from the scope of this disclosure.

Referring to FIG. 7, according to an embodiment, an electronic device 701 may be included in a network environment 700. The electronic device 701 may include at least one of a bus 710, a processor 720, a memory 730, an input/output interface 750, a display 760, a communication interface 770, or an event processing module 780. In some embodiments, the electronic device 701 may exclude at least one of the components or may add another component.

The bus 710 may include a circuit for connecting the components 720 through 780 with one another and transferring communications (e.g., control messages and/or data) between the components.

The processing module 720 may include one or more of a central processing unit (CPU), an application processor (AP), or a communication processor (CP). The processor 720 may perform control on at, least one of the other components of the electronic device 701, and/or perform an operation or data processing relating to communication.

The memory 730 may include a volatile and/or non-volatile memory. For example, the memory 730 may store commands or data related to at least one other component of the electronic device 701. According to an embodiment of the present disclosure, the memory 730 may store software and/or a program 740. The program 740 may include, e.g., a kernel 741, middleware 743, an application programming interface (API) 745, and/or an application program (or "application") 747. At least a portion of the kernel 741, middleware 743, or API 745 may be denoted an operating system (OS).

For example, the kernel 741 may control or manage system resources (e.g., the bus 710, processor 720, or a memory 730) used to perform operations or functions implemented in other programs (e.g., the middleware 743, API 745, or application program 747). The kernel 741 may provide an interface that allows the middleware 743, the API 745, or the application 747 to access the individual components of the electronic device 701 to control or manage the system resources.

The middleware 743 may function as a relay to allow the API 745 car the application 747 to communicate data with the kernel 741, for example. A plurality of applications 747 may be provided. The middleware 743 may control work requests received from the applications 747, e.g., by allocation the priority of using the system resources of the electronic device 701 (e.g., the bus 710, the processor 720, or the memory 730) to at least one of the plurality of applications 734.

The API 745 may be an interface allowing the application 747 to control functions provided from the kernel 741 or the middleware 743. For example, the API 733 may include at least one interface or function (e.g., a command) for filing control, window control, image processing or text control.

The input/output interface 750 may serve as an interface that may, e.g., transfer commands or data input from a user or other external devices to other component(s) of the electronic device 701. Further, the input/output interface 750 may output commands or data received from other component(s) of the electronic device 701 to the user or the other external device.

The display 760 may include, e.g., a liquid crystal display (LCD), a light emitting diode (LED) display, an organic light emitting diode (OLED) display, or a microelectromechanical systems (MEMS) display, or an electronic paper display. The display 760 may display, e.g., various contents (e.g., text, images, videos, icons, or symbols) to the user. The display 760 may include a touchscreen and may receive, e.g., a touch, gesture, proximity or hovering input using an electronic pen or a body portion of the user.

For example, the communication interface 770 may set up communication between the electronic device 701 and an external electronic device (e.g., a first electronic device 702, a second electronic device 704, or a server 706). For example, the communication interface 770 may be connected with the network 762 or 764 through wireless or wired communication to communicate with the external electronic device.

The first external electronic device 702 or the second external electronic device 704 may be a wearable device or an electronic device similar to electronic device 701 which may be a mountable wearable device (e.g., a head mounted display (HMD)). When the electronic device 701 is mounted in a HMD (e.g., the first electronic device 702), the electronic device 701 may detect the mounting in the HMD and operate in a virtual reality mode. When the electronic device 701 is mounted in the electronic device 702 (e.g., the HMD), the electronic device 701 may communicate with the electronic device 702 through the communication interface 770. The electronic device 101 may be directly connected with the electronic device 702 to communicate with the electronic device 702 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 762 may include at least one of communication networks, e.g., a computer network (e.g., local area network (LAN) or wide area network (WAN)), Internet, or a telephone network.

The first and second external electronic devices 702 and 704 each may be a device of the same or a different type from the electronic device 701. According to an embodiment, the server 706 may include a group of one or more servers. According to an embodiment, all or some of operations executed on the electronic device 701 may be executed on another or multiple other electronic devices (e.g., the electronic devices 702 and 704 or server 706). According to an embodiment of the present disclosure, when the electronic device 701 should perform some function or service automatically or at a request, the electronic device 701, instead of executing the function or service on its own or additionally, may request another device (e.g., electronic devices 702 and 704 or server 706) to perform at least some functions associated therewith. The other electronic device (e.g., electronic devices 702 and 704 or server 706) may execute the requested functions or additional functions and transfer a result of the execution to the electronic device 701. The electronic device 701 may provide a requested function or service by processing the received result as it is or additionally. To that end, a cloud computing, distributed computing, or client-server computing technique may be used, for example.

Although FIG. 7 shows that the electronic device 701 includes the communication interface 770 to communicate with the external electronic device 704 or 706 via the network 762, the electronic device 701 may be independently operated without a separate communication function, according to an embodiment of the present invention.

The server 706 may support to drive the electronic device 701 by performing at least one of operations (or functions) implemented on the electronic device 701. For example, the server 706 may include an event processing server module that may support the event processing module 780 implemented in the electronic device 701.

For example, the event processing server module may include at least one of the components of the event processing module 780 and perform (or instead perform) at least one of the operations (or functions) conducted by the event processing module 780.

The event processing module 780 may process at least part of information obtained from other elements (e.g., the processor 720, the memory 730, the input/output interface 750, or the communication interface 770) and may provide the same to the user in various manners.

Although in FIG. 7 the event processing module 780 is shown to be a module separate from the processor 720, at least a portion of the event processing module 780 may be included or implemented in the processor 720 or at least one other module, or the overall function of the event processing module 780 may be included or implemented in the processor 720 shown or another processor. The event processing module 780 may perform operations according to embodiments of the present invention in interoperation with at least one program 740 stored in the memory 730.

Exemplary embodiments described herein are not meant to be limiting and merely illustrative of various aspects of the invention. While exemplary embodiments may be indicated as applicable to a particular device category (e.g., mobile phone, etc.) the processes and examples provided are not intended to be solely limited to the device category and can be broadly applicable to various device categories (e.g., appliances, computers, automobiles, etc.). According to a non-limiting embodiment, an electronic device may include a smartphone, an augmented reality device, a smart speaker, a personal computer, a tablet computer; or any device connected to the internet of things.

Although FIG. 7 shows one example of a network configuration 700 including an electronic device 701, two external electronic devices 702 and 704, and a server 706, various changes may be made to FIG. 7. For example, the network configuration 700 could include any number of each component in any suitable arrangement. In general, computing and communication systems come in a wide variety of configurations, and FIG. 7 does not limit the scope of this disclosure to any particular configuration. Also, while FIG. 7 shows one operational environment in which various features disclosed in this patent document can be used, these features could be used in any other suitable system.

The method of generating a trained trigger word detection model or the method of detecting a trigger word may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 701, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The method of generating a trained trigger word detection model or the method of detecting a trigger word may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

Figure 8:
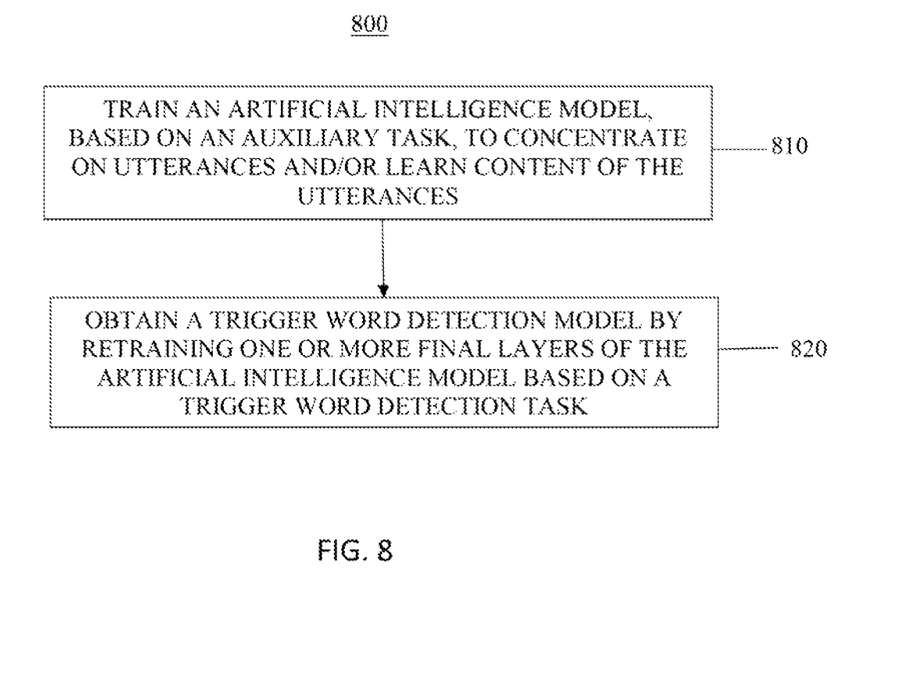
FIG. 8 is a flowchart of a method of generating a trained trigger word detection model according to an embodiment.

FIG. 8 is a flowchart of a method 800 of generating a trained trigger word detection model according to an embodiment.

At operation 810, an auxiliary model may be trained, based on an auxiliary task, to concentrate on one or more utterances and/or learn content of the one or more utterances. According to an embodiment, the training may be self-supervised. The training data may be unlabeled generic single word and/or phrase data that may include utterances of the one or more trigger words or may include utterances that are different than the one or more trigger words.

According to an embodiment, the auxiliary model may be trained based on contrastive learning such that audio files with the same utterance are drawn closer together and audio filed with different utterances are drawn away from each other. For example, training the auxiliary model based on the auxiliary task may include repeatedly inputting a first type of audio file and a second type of audio file. The first type of audio file may include clean audio of a comparison utterance and the second type of audio file may include positive audio files and negative audio files. The positive audio files may include the comparison utterance and one or ore of noise or reverberation. The negative audio files may include one or more of noise, reverberations, or an utterance other than the comparison utterance. According to an embodiment, the auxiliary model may be a neural network such as a Siamese network.

According to an embodiment, the one or more noise or reverberations may include environment induced reverberations or noise of different noise types. The positive audio files may include spectral augmentation of the comparison utterance audio input.

According to another embodiment, the auxiliary model may be trained to predict whether an input audio file of an utterance is in sequence or jumbled. For example, training the auxiliary model based on the auxiliary task may include obtaining a plurality of audio files, where each filed include same or different utterances. The audio files may then be augmented with noise or reverberations and split into multiple segments to provide a plurality of segmented audio files. A portion of the segmented audio files may be jumbled to provide a plurality of partially jumbled, segmented audio files. The partially jumbled segmented audio files may be repeatedly input into the auxiliary model which is tasked to determine whether the files are jumbled.

At operation 820, one or more final layers of the auxiliary model, which is weighted based on the auxiliary task, may be retrained based on a trigger word detection task that detects and one or more trigger words.

Accordingly, to an embodiment, one or ore of the final dense layers, all of the dense layers, or all of the model layers of the auxiliary model may be retrained based on the trigger word detection task. When the layers of the auxiliary model are retrained based on the trigger word detection task, they may be trained with less training data per class and/or using training data with less or minimal augmentation. That is, the layers may be retrained with a reduced learning rate.

According to an embodiment, the one or more final layers may be retrained on an edge device of a user using training data that is specific to a voice of the user. According to an embodiment, the one or more final layers may be retrained with a low learning rate. According to an embodiment, the trigger word detection task may detect on and a classify multiple trigger words such as pause, play, and next in an audio environment, however, the disclosure is not limited to the example trigger words.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method of generating a trained trigger word detection model, the method comprising:
training an auxiliary model, based on an auxiliary task, to concentrate on one or more utterances and to learn context of the one or more utterances using phrase training data, wherein the phrase training data comprises pairs of first audio files and second audio files, each of the first audio files comprising first clean audio of a first comparison utterance, and each of the second audio files comprising at least one of a third clean audio, different from the first clean audio, of the first comparison utterance, and a fourth clean audio of a second comparison utterance, different from the first comparison utterance; and
obtaining a trigger word detection model by retraining one or more final layers of the auxiliary model, which is weighted based on the auxiliary task, based on a trigger word detection task that detects one or more trigger words;
wherein the retraining uses training data specific to the one or more trigger words.

2. The method of claim 1, wherein the auxiliary model is trained based on the auxiliary task such that matching audio files having same utterances are drawn closer together and distinct audio files having different utterances are drawn away from each other.

3. The method of claim 2, wherein training the auxiliary model based on the auxiliary task comprises repeatedly inputting the pairs of first audio files and the second audio files,
wherein each of the second audio files further comprises at least one of the first clean audio of the first comparison utterance, or a combination of the first clean audio of the first comparison utterance with a spectral augmentation, and
wherein each of the second audio files further comprises one or more noise signals comprising at least one of a noise signal, and one or more reverberations.

4. The method of claim 1, wherein the auxiliary model is trained to predict whether an input audio file of an utterance is in sequence or jumbled.

5. The method of claim 4, wherein training the auxiliary model based on the auxiliary task comprises:
obtaining a plurality of audio files, each audio file including an utterance;
splitting each of the plurality of audio files into segments to provide a plurality of segmented audio files;
jumbling a portion of the plurality of segmented audio files to provide a plurality of partially jumbled segmented audio files; and
repeatedly inputting audio files from among the plurality of partially jumbled segmented audio files into the auxiliary model.

6. The method of claim 1, wherein the retraining of the auxiliary model may be performed on an edge device of a user, and training data specific to the one or more trigger words is specific to a voice of the user.

7. The method of claim 1, wherein the trigger word detection task classifies the one or more trigger words.

8. An apparatus for generating a trained trigger word detection model, the apparatus comprising:
at least one memory storing instructions; and
at least one processor configured to execute the instructions to:
train an auxiliary model, based on an auxiliary task, to concentrate on one or more utterances and to learn context of the one or more utterances using phrase training data, wherein the phrase training data comprises pairs of first audio files and second audio files, each of the first audio files comprising first clean audio of a first comparison utterance, and each of the second audio files comprising at least one of a third clean audio, different from the first clean audio, of the first comparison utterance, and a fourth clean audio of a second comparison utterance, different from the first comparison utterance; and
obtain a trigger word detection model by retraining one or more final layers of the auxiliary model, which is weighted based on the auxiliary task, based on a trigger word detection task that detects one or more trigger words;
wherein the retraining uses training data specific to the one or more trigger words.

9. The apparatus of claim 8, wherein the auxiliary model is trained based on the auxiliary task such that matching audio files having same utterances are drawn closer together and distinct audio files having different utterances are drawn away from each other.

10. The apparatus of claim 9, wherein training the auxiliary model based on the auxiliary task comprises repeatedly inputting the pairs of first audio files and the second audio files,
wherein each of the second audio files further comprises at least one of the first clean audio of the first comparison utterance, or a combination of the first clean audio of the first comparison utterance with a spectral augmentation, and
wherein each of the second audio files further comprises one or more noise signals comprising at least one of a noise signal, and one or more reverberations.

11. The apparatus of claim 8, wherein the auxiliary model is trained to predict whether an input audio file of an utterance is in sequence or jumbled.

12. The apparatus of claim 11, wherein the at least one processor is further configured to:
obtain a plurality of audio files, each audio file including an utterance;
split each of the plurality of audio files into segments to provide a plurality of segmented audio files;
jumble a portion of the plurality of segmented audio files to provide a plurality of partially jumbled segmented audio files; and
repeatedly input audio files from among the plurality of partially jumbled segmented audio files into the auxiliary model.

13. The apparatus of claim 8, wherein the retraining of the auxiliary model may be performed on an edge device of a user, and training data specific to the one or more trigger words is specific to a voice of the user.

14. The apparatus of claim 8, wherein the trigger word detection task classifies the one or more trigger words.

15. A non-transitory computer-readable medium storing instructions, the instructions comprising: one or more instructions that, when executed by one or more processors, cause the one or more processors to:
    train an auxiliary model, based on an auxiliary task, to concentrate on one or more utterances and to learn context of the one or more utterances using phrase training data, wherein the phrase training data comprises pairs of first audio files and second audio files, each of the first audio files comprising first clean audio of a first comparison utterance, and each of the second audio files comprising at least one of a third clean audio, different from the first clean audio, of the first comparison utterance, and a fourth clean audio of a second comparison utterance, different from the first comparison utterance; and
    obtain a trigger word detection model by retraining one or more final layers of the auxiliary model, which is weighted based on the auxiliary task, based on a trigger word detection task that detects one or more trigger words;
    wherein the retraining uses training data specific to the one or more trigger words.

16. The non-transitory computer-readable medium of claim 15, wherein the auxiliary model is trained based on the auxiliary task such that matching audio files having same utterances are drawn closer together and distinct audio files having different utterances are drawn away from each other.

17. The non-transitory computer-readable medium of claim 16, wherein training the auxiliary model based on the auxiliary task comprises repeatedly inputting the pairs of first audio files and the second audio files,
    wherein each of the second audio files further comprises at least one of the first clean audio of the first comparison utterance, or a combination of the first clean audio of the first comparison utterance with a spectral augmentation, and
    wherein each of the second audio files further comprises one or more noise signals comprising at least one of a noise signal, and one or more reverberations.

18. The non-transitory computer-readable medium of claim 15, wherein the auxiliary model is trained to predict whether an input audio file of an utterance is in sequence or jumbled.

19. The non-transitory computer-readable medium of claim 18, the instructions further comprise one or more instructions that, when executed by the one or more processors, cause the one or more processors to:
    obtain a plurality of audio files, each audio file including an utterance;
    split each of the plurality of audio files into segments to provide a plurality of segmented audio files;
    jumble a portion of the plurality of segmented audio files to provide a plurality of partially jumbled segmented audio files; and
    repeatedly input audio files from among the plurality of partially jumbled segmented audio files into the auxiliary model.

20. The non-transitory computer-readable medium of claim 15, wherein the trigger word detection task classifies the one or more trigger words.

* * * * *